United States Patent [19]
Haeberle et al.

[11] Patent Number: 5,387,367
[45] Date of Patent: Feb. 7, 1995

[54] NONAQUEOUS POLYISOCYANATE FORMULATION

[75] Inventors: Karl Haeberle, Neustadt; Lothar Maempel, Breuhl; Ulrich Filges, Limburgerhof, all of Germany

[73] Assignee: BASF Aktiengesellschaft, Ludwigshafen, Germany

[21] Appl. No.: 206,893

[22] Filed: Mar. 7, 1994

Related U.S. Application Data

[63] Continuation of Ser. No. 763,813, Sep. 23, 1991, abandoned.

[30] Foreign Application Priority Data

Nov. 20, 1990 [DE] Germany ............... 4036927

[51] Int. Cl.⁶ ............... C08G 18/30; C09K 3/00
[52] U.S. Cl. ............... 252/182.22; 252/182.2; 252/182.21
[58] Field of Search ............ 252/182.2, 182.21, 182.22

[56] References Cited

U.S. PATENT DOCUMENTS

| | | | |
|---|---|---|---|
| 4,413,112 | 11/1983 | Reiff et al. | 528/73 |
| 4,433,095 | 2/1984 | Hornbach et al. | 524/563 |
| 4,663,377 | 5/1987 | Hornbach et al. | 524/196 |
| 5,135,963 | 3/1992 | Haeberle | 522/84 |
| 5,258,452 | 11/1993 | Reiff | 252/182.22 |
| 5,290,902 | 3/1994 | Jacobs et al. | 252/182.22 |

FOREIGN PATENT DOCUMENTS 0013112  7/1980  European Pat. Off.
0095594 12/1983  European Pat. Off.

*Primary Examiner*—Edward A. Miller
*Attorney, Agent, or Firm*—Oblon, Spivak, McClelland, Maier & Neustadt

[57] ABSTRACT

Nonaqueous polyisocyanate formulation containing
a) one or more aliphatic polyisocyanates having a mean NCO functionality of from 2.5 to 3.5 and
b) an amount, which ensures that the polyisocyanate is dispersible, of a reaction product of a diisocyanate selected from the group consisting of tetramethylene diisocyanate, hexamethylene diisocyanate, dodecamethylene diisocyanate, 1,4-diisocyanatocyclohexane, 4,4'-di-(isocyanatocyclohexyl)-methane, diisocyanatotrimethylhexane, diisocyanatotetramethylhexane, 1-isocyanato-3,3,5-trimethyl-5-(isocyanatomethyl)-cyclohexane, toluylene 2,4- and 2,6-diisocyanate, tetramethylxylylene diisocyanate, p-xylylene diisocyanate, 2,4'- and 4,4'-diisocyanatodiphenylmethane and a mixture of two or more of these diisocyanates with a monohydric or polyhydric polyalkylene ether alcohol where the alkylene groups are of 2 to 4 carbon atoms and which contains a polyether chain having 8 or more ethylene oxide units, are prepared and are used in aqueous coating materials and in adhesive dispersions.

7 Claims, No Drawings

NONAQUEOUS POLYISOCYANATE FORMULATION

This application is a continuation of application Ser. No. 07/763,813, filed on Sep. 23, 1991 now abandoned.

The present invention relates to a nonaqueous polyisocyanate formulation containing a) one or more aliphatic polyisocyanates having a mean NCO functionality of from 2.5 to 3.5 and b) an amount, which ensures that the polyisocyanate is dispersible, of a reaction product of a diisocyanate selected from the group consisting of tetramethylene diisocyanate, hexamethylene diisocyanate, dodecamethylene diisocyanate, 1,4-diisocyanatocyclohexane, 4,4'-di-(isocyanatocyclohexyl)-methane, diisocyanatotrimethylhexane, diisocyanatotetramethylhexane, 1-isocyanato-3,3,5-trimethyl-5-(isocyanato-methyl)-cyclohexane, toluylene 2,4- and 2,6-diisocyanate, tetramethylxylylene diisocyanate, p-xylylene diisocyanate, 2,4'- and 4,4'-diisocyanatodiphenylmethane and a mixture of two or more of these diisocyanates with a monohydric or polyhydric polyalkylene ether alcohol where the alkylene groups are of 2 to 4 carbon atoms and which contains a polyether chain having 8 or more ethylene oxide units.

Nonaqueous polyisocyanate formulations are known per se. They can be emulsified in water or are advantageously stirred into aqueous polymer latices.

Compared with the aqueous polyisocyanate formulations of U.S. Pat. No. 4,396,738, the nonaqueous formulations have the advantage of a substantially improved shelf life.

EP-A 13 112, EP-A 61 628 and U.S. Pat. No. 4,413,112 disclosed polyisocyanate formulations based on aromatic polyisocyanates for the preparation of adhesives. However, various performance characteristics of these formulations do not meet the increasing requirements. The range of applications of the polyisocyanate formulations is greatly restricted since they do not ensure sufficient emulsifiability.

EP-A 206 059 disclosed polyisocyanate formulations which consist of an aliphatic polyisocyanate and an emulsifier which is a reaction product of a polyethylene ether alcohol with polyisocyanates. A large number of isocyanates, which can be used for the preparation of the emulsifier, are mentioned. However, if these emulsifiers were to be used for emulsifying polyisocyanates in water, it would be found that these emulsions do not have a long shelf life. They settle out after standing for only a short time and can be stirred up and reconverted into a usable state only with difficulty, if at all. Their range of uses is therefore greatly restricted.

It is an object of the present invention to provide nonaqueous polyisocyanate formulations which have a balanced profile of performance characteristics and can be processed in a simple manner to give aqueous emulsions or dispersions which have a long shelf life and do not form sediment.

We have found that this object is achieved by the nonaqueous polyisocyanate formulation defined above, a process for its preparation and its use in aqueous coating materials and in adhesive dispersions.

Preferred embodiments of the invention are described in the subclaims.

It is known that a nonaqueous polyisocyanate formulation can be obtained by a conventional reaction of nonaqueous reagents in nonaqueous media.

An essential feature of the present invention is reaction product b). This serves as an emulsifier when the nonaqueous formulation is dispersed or emulsified in an aqueous medium. Readily emulsifiable products having a long shelf life are obtained when b) is prepared from the abovementioned diisocyanates. 4,4'-Diisocyanatodiphenylmethane (MDI), 4,4'-di-(isocyanatocyclohexyl)methane (HMDI), especially toluylene 2,4- and 2,6-diisocyanate (TDI) are preferred. In many cases, hexamethylene diisocyanate (HDI) and 1-isocyanato-3,3,5-trimethyl-5-(isocyanatomethyl)-cyclohexane (IPDI) have also proven useful.

The alcohol component used in the reaction product b) is a polyalkylene ether alcohol. The alkylene group is of 2 to 4 carbon atoms, $-CH_2-CH(CH_3)-$, $-(CH_2)_4-$ and, preferably, $-(CH_2)_2-$ being typical. The polyalkylene ether alcohol contains a plurality of alkylene ether chains or, preferably, one alkylene ether chain and is accordingly polyhydric or, preferably, monohydric. One or more of the alkylene ether chains contains a polyethylene ether chain comprising not less than 8, preferably not less than 10, ethylene oxide units. This chain generally has not more than 70, preferably not more than 20, ethylene oxide units. The polyalkylene ether chains may have a mixed composition, for example consisting of ethylene oxide and propylene oxide units. Good results are obtained when the polyalkylene ether alcohol contains not less than 60% by weight of ethylene oxide units. Pure polyethylene oxide chains are preferred. Examples are polyethylene glycols.

For the preparation of conventional polyalkylene ether alcohols, conventional, polyhydric or preferably monohydric initiator molecules, for example cyclohexanol, 3-methyl-3-hydroxymethyloxethane, phenol, ethylene glycol, propylene glycol, aniline, pentaerythritol, trimethylolpropane or glycerol, are suitable. $C_1-C_6$-alkanols are preferred, for example methanol and n-butanol.

For the reaction of the diisocyanates with the alcohols, usually from 60 to 120, preferably from 80 to 120, equivalent %, based on the NCO groups of the diisocyanate, of OH groups of the polyalkylene ether alcohol are used. One OH group of the alcohol is made equivalent to one NCO group of the diisocyanate.

The reaction product b) is mixed with the polyisocyanate a) in an amount such that the polyisocyanate formulation contains from 1 to 25, preferably from 5 to 20, in particular from 10 to 15, % by weight of ethylene oxide units of the polyalkylene ether chains of the reaction product b).

The aliphatic polyisocyanate a) has a higher NCO functionality, i.e. from 2.5 to 3.5, than the diisocyanate. The mean NCO functionality of a mixture is calculated from the number of NCO groups per individual compound of the mixture, averaged over the molar amounts of the individual compounds in the mixture.

The polyisocyanate a) has in general an NCO content of from 5 to 30, preferably from 10 to 25, % by weight.

For the purposes of the present invention, aliphatic polyisocyanates are:

1. Polyisocyanates containing isocyanurate groups and based on aliphatic and/or cycloaliphatic diisocyanates. The corresponding isocyanatoisocyanurates based on 1,6-diisocyanatohexane and/or 1-isocyanato 3,3,5-trimethyl-5-(isocyanatomethyl)- cyclohexane (isophorone diisocyanate (IPDI) are particularly preferred. The preparation of such polyisocyanates containing isocyanurate groups is described in, for example, DE-A 2 616 416, EP-A 3765, EP-A 10 589, EP-A 47 452, U.S. Pat. No. 4,288,586 or U.S. 4,324,879. In principle, the novel polyisocyanate formulation may contain, as component a), not only these particularly preferred compounds but any polyisocyanates containing isocyanurate groups and based on aliphatic and/or cycloaliphatic diisocyanates. The isocyanatoisocyanurates which are suitable as component a) are thus in particular simple trisisocyanatoalkyl (or -cycloalkyl) isocyanurates of the formula

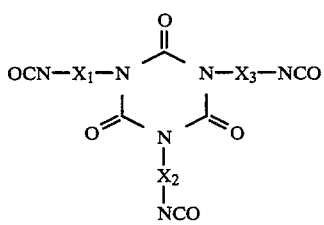

or mixtures thereof with their higher homologs having more than one isocyanurate ring; in this formula, $X_1, X_2$ and $X_3$ are identical or different and are each the hydrocarbon radical on which the starting diisocyanate is based. The isocyanatoisocyanurates have in general an NCO content of from 10 to 30, preferably from 15 to 25, % by weight and a mean NCO functionality of from 2.6 to 3.5.

For the purposes of the present invention, aliphatic polyisocyanates are furthermore:

2. Biuret-containing polyisocyanates having aliphatically bonded isocyanate groups, in particular tris(6-isocyanatohexyl)-biuret or its mixtures with its higher homologs. These biuret-containing polyisocyanates have in general an NCO content of from 18 to 20% by weight and a mean NCO functionality of from 3 to 3.5.

For the purposes of the present invention, aliphatic polyisocyanates are furthermore:

3. Polyisocyanates having urethane and/or allophanate groups and aliphatically or cycloaliphatically bonded isocyanate groups, as can be obtained, for example, by reacting excess amounts of hexamethylene diisocyanate or of IPDI with simple monohydric alcohols, for example trimethylolpropane, glycerol, 1,2-dihydroxypropane or mixtures thereof. These polyisocyanates which contain urethane and/or allophanate groups and are suitable as component a) have in general an NCO content of from 12 to 20% by weight and a mean NCO functionality of from 2.5 to 3.

Polyisocyanates of groups 1 and 2 are preferred. It is of course also possible to use a mixture of the stated polyisocyanates.

The novel polyisocyanate formulation is prepared in two stages. First, the reaction product b) is prepared. This reaction of the polyalkylene ether alcohol with the diisocyanate is known per se and usually takes place at from 20° to 150° C. preferably from 40° to 130° C. The reaction time is in general such that not less than 90% by weight of those groups of the polyalkylene ether alcohol which are reactive toward isocyanate groups react with isocyanate. The reaction can be accelerated by the presence of conventional, catalytic substances, such dibutyltin dilaurate, tin(II) octoate or 1,4-diazabicyclo[2.2.2]octane.

In a subsequent second process step, the polyisocyanate a) is mixed with the reaction product b), and in some cases inert solvents may be present. This may be carried out in a known manner by stirring at room temperature or slightly elevated temperatures.

The polyisocyanate formulation thus prepared is preferably used as such. It is of course also possible to add small amounts, for example from 1 to 10% by weight, based on the solvent-free formulation, of an organic solvent, e.g. ethyl acetate, acetone or methyl ethyl ketone, to the formulation before it is used, in order to reduce the viscosity. It is furthermore possible to convert the novel polyisocyanate formulations into aqueous emulsions or dispersions having a water content of in general from 90 to 35% by weight. These dispersions or emulsions are prepared by simply mixing the polyisocyanate formulation with water. Only small shear forces are required, which is a considerable advantage for the processor. Mixing apparatuses familiar to the skilled worker, such as simple stirring apparatuses, may be used.

The novel polyisocyanate formulation is suitable for modifying aqueous coating materials for metal, wood, paper, board, plastic, textiles and in particular leather, based on aqueous dispersions or solutions having a solids content of from 5 to 40, preferably from 5 to 20, % by weight. Suitable coating materials are the conventional aqueous dispersions of homopolymers and copolymers of olefinically unsaturated monomers or polyurethanes or solutions of natural substances, for example of casein.

The novel polyisocyanate formulations are added to the aqueous coating materials in general in an amount of from 1 to 25, preferably from 2.5 to 20, % by weight, based on the solids content of the coating material.

They are applied to the substrate in a known manner by, for example, spraying in an amount of from 5 to 50 g of solid/$m^2$. In the coating of leather or imitation leather with dispersions or solutions modified in this manner, particularly good wet rub fastnesses and flexing endurances are obtained.

The novel polyisocyanate formulation is particularly suitable for modifying aqueous adhesives, for example those based on aqueous dispersions having a solids content corresponding to a binder content of from 10 to 65, preferably from 20 to 60%, by weight, such as natural latex, aqueous dispersions of homopolymers or copolymers of olefinically unsaturated monomers and the conventional aqueous polyurethane dispersions.

Suitable dispersions of homopolymers or copolymers of olefinically unsaturated monomers are, for example, conventional dispersions of homopolymers or copolymers based on vinyl esters of carboxylic acids of 2 to 18, preferably 2 to 4, carbon atoms, in particular vinyl acetate, if required with not more than 70 % by weight, based on the total amount of olefinically unsaturated monomers, of other olefinically unsaturated monomers and/or of homopolymers or copolymers of (meth)acrylates of alcohols of 1 to 18, preferably 1 to 4, carbon atoms, in particular methyl, ethyl, propyl, hydroxyethyl or hydroxypropyl (meth)acrylate, if required with not more than 70% by weight of other olefinically unsaturated monomers and/or butadiene/styrene copolymers containing from about 20 to 60% by weight of butadiene and/or other diene polymers or copolymers, such as polybutadiene, or copolymers of butadiene with other olefinically unsaturated monomers, e.g. styrene, acrylonitrile and/or methacrylonitrile, and/or aqueous dispersions of polymers or copolymers of 2-chlorobuta-1,3-diene, with or without other olefinically unsaturated monomers of the type stated above by way of example, for example those having a chlorine content of from about 30 to 40, in particular about 36, % by weight.

Aqueous dispersions of copolymers of from 90 to 99.5% by weight, based on the copolymer, of acrylates or methacrylates of alkanols of 1 to 4 carbon atoms and from 0.5 to 10% by weight, based on the copolymer, of hydroxyalkyl acrylates and methacrylates where the hydroxyalkyl radical is of 2 to 20 carbon atoms, such as hydroxyethyl, hydroxypropyl or hydroxybutyl acrylate or methacrylate, are preferred. Such dispersions are known per se and can be prepared in a conventional manner by emulsion polymerization (cf. Houben-Weyl, Methoden der organischen Chemie, 4th Edition, Vol. E 20, page 217 et seq.).

Suitable aqueous polyurethane dispersions are those of the conventional type, as described in, for example, U.S. Pat. No. 3,479,310, GB-A 1,076,688, U.S. Pat. No. 4,108,814, U.S. Pat. No. 4,108,814, U.S. Pat. No. 4,092,286, DE-A 2,651,505, U.S. Pat. No. 4,190,566, DE-A 2 732 131 or DE-A 2 811 148.

The aqueous adhesives used may contain the assistants and additives usually used in adhesive technology. These include, for example, fillers, such as quartz powder, quartz sand, finely divided silica, barite, calcium carbonate, chalk, dolomite or talc, which are often used together with suitable wetting agents, for example polyphosphates, such as sodium hexametaphosphate, naphthalenesulfonic acid or ammonium or sodium polyacrylates, the wetting agents generally being added in amounts of from 0.2 to 0.6% by weight, based on the filler.

Other suitable assistants are, for example, organic thickeners to be used in amounts of from 0.01 to 1% by weight, based on adhesive, for example cellulose derivatives, alginates, starch or starch derivatives or polyacrylic acid, or inorganic thickeners to be used in amounts of from 0.05 to 5% by weight, based on the adhesive, for example bentonites.

Fungicides for preservation may also be added to the adhesives. These are used in general in amounts of from 0.02 to 1% by weight, based on adhesive. Examples of suitable fungicides are phenol and cresol derivatives or organotin compounds.

Tackifiers, for example natural resin or modified resins, such as rosin esters, or synthetic resins, such as phthalate resins, may also be present in the adhesive in known amounts.

Solvents, for example toluene, xylene, butyl acetate, methyl ethyl ketone, ethyl acetate, dioxane or mixtures thereof, or plasticizers, for example those based on adipate, phthalate or phosphate, may also be added to the aqueous adhesive dispersions.

The novel polyisocyanate formulations are added to the aqueous adhesives in general in an amount of from 1 to 20, preferably from 2 to 10, % by weight, based on the binder of the aqueous adhesive dispersion.

For this purpose, the novel nonaqueous polyisocyanate formulation can be stirred into the adhesive dispersion in a known manner. In some cases, good results are obtained if an aqueous dispersion is first prepared and is mixed with the adhesive dispersion.

The aqueous adhesives modified in this manner are suitable for adhesively bonding any materials of the same type or different types, for example for adhesively bonding wood, paper, plastics, textiles, leather and inorganic materials, such as ceramic, stoneware or asbestos cement.

The Examples which follow illustrate the invention. Parts and percentages are by weight, unless stated otherwise.

EXAMPLES

Polyalkylene ether alcohol b1:

Monofunctional polyethylene oxide initiated with methanol and having an OH number of 112, measured according to DIN 53,240, corresponding to a molecular weight of 500. b1 contains a polyether chain having more than 8 ethylene oxide units.

Polyalkylene ether alcohol b2:

Monofunctional polyethylene oxide initiated with n-butanol and having an OH number of 64, corresponding to a molecular weight of 870 g/mol. b2 contains a polyether chain having more than 8 ethylene oxide units. Polyisocyanate a1:

Biuret-containing polyisocyanate based on 1,6-diisocyanatohexane and essentially consisting of N,N', N''-tris-(6-isocyanatohexyl)-biuret and its higher homologs and having an NCO content of 21.9%, a content of monomeric 1,6-diisocyanatohexane of less than 0.5% by weight, a viscosity at 23° of 2.9 Pa.s and a mean NCO functionality of 3.3, according to the polyisocyanate 2 of EP-A 206 059.

Polyisocyanate a2:

Polyisocyanate which contains isocyanurate groups, is prepared by trimerization of some of the isocyanate groups of 1,6-diisocyanatohexane and essentially consists of tris-(6-isocyanatohexyl) isocyanurate and its higher homologs and has an NCO content of 22.2%, a content of monomeric diisocyanate of less than 0.3%, a viscosity at 23° C. of 2.8 Pa.s and a mean NCO functionality of about 3.3, according to polyisocyanate 1 of EP-A 206 059.

Polyisocyanate a3:

Isocyanatoisocyanurate obtained by trimerization of some of the isocyanate groups of IPDI and having an NCO content of 12.0%, a content of monomeric IPDI of less than 0.5% by weight, a viscosity at 23° C. of 1.5 Pa.s and a mean NCO functionality of 3.3; 70% strength solution in a 1 : 1 mixture of butyl acetate/Solvesso ® 100 (IPDI-T 1890 L from Hüls); according to polyisocyanate 5 of EP-A 206 059.

aV; for comparison:

Crude diphenylmethane 4,4'-diisocyanate having an NCO content of 31% by weight and a viscosity at 23° C. of 0.2 Pa.s, Lupranat®M 20 from BASF (crude MDI).

EXAMPLE 1

40 g (0.15 mol) of 4,4'-di-(isocyanatocyclohexyl)-methane (HMDI) are added to 150 g (0.3 mol) of b1 at 60° C. and the mixture is stirred for 30 minutes. It is then cooled to 30° C. and 900 g of a1 are stirred in. A nonaqueous formulation having an NCO content of 17.9%, a viscosity of 2.8 Pa.s at 23° C. and a content of ethylene oxide units of 13% is obtained.

EXAMPLE 2

25 g (0.15 mol) of a mixture of 80 parts of toluylene 2,4-diisocyanate (2,4-TDI) and 20 parts of toluylene 2,6-diisocyanate (2,6-TDI) are added to 150 g (0.3 mol) of b1 at 60° C. and the mixture is stirred for 30 minutes. It is then cooled to 30° C. and 900 g of a1 are stirred in. A nonaqueous formulation having an NCO content of 17.7% by weight and a viscosity of 4.3 Pa.s at 23° C. is obtained.

EXAMPLE 3

40 g of 4,4'-di-(isocyanatocyclohexyl)-methane (HMDI) are added to 150 g of b1 at 60° C. and the mixture is stirred for 180 minutes. 900 g of a2 are then stirred in. Cooling to room temperature gives a nonaqueous formulation having an NCO content of 18.3% by weight and a viscosity of 2.5 Pa.s at 23° C.

EXAMPLE 4

26 g of a mixture of 80 parts of toluylene 2,4diisocyanate (2,4-TDI) and 20 parts by weight of toluylene 2,6-diisocyanate (2,6-TDI) are added to 150 g of b1 at 60° C. and the mixture is stirred for 60 minutes. It is then cooled to 30° C. and 900 g of a2 are stirred in. A nonaqueous formulation having an NCO content of 18.4% and a viscosity of 3.0 Pa.s at 23° C. is obtained.

EXAMPLE 5

38 g (0.15 mol) of 4,4'-diisocyanatodiphenylmethane (MDI) are added to 150 g (0.3 mol) of b1 at 40° C. and the mixture is stirred for 30 minutes. It is then cooled to 30° C. and 900 g of a1 are stirred in. A nonaqueous formulation having an NCO content of 18.0% and a viscosity of 3.9 Pa.s is obtained.

EXAMPLE 6

26 g (0.15 mol) of a mixture of 80 parts of toluylene 2,4-diisocyanate and 20 parts of toluylene 2,6-diisocyanate are added to 150 g (0.3 mol) of b1 at 60° C. and the mixture is stirred for 30 minutes. It is then cooled to 30° C. and 900 g of a3 are stirred in. A nonaqueous formulation having an NCO content of 9.9% and a viscosity of 4.4 Pa.s is obtained.

EXAMPLE 7

34 g (0.15 mol) of tetramethylhexane diisocyanate are added to 150 g (0.3 mol) of b1 at 60° C. and the mixture is stirred for 90 minutes. It is then cooled to 30° C. and 900 g of a1 are stirred in. A nonaqueous formulation having an NCO content of 18.0% and a viscosity of 3.3 Pa.s is obtained.

EXAMPLE 8

25 g (0.15 mol) of hexamethylene diisocyanate (HDI) are added to 150 g (0.3 mol) of b1 at 60° C. and the mixture is stirred for 30 minutes. It is then cooled to 30° C. and 900 g of a1 are stirred in. A nonaqueous formulation having an NCO content of 18.1% and a viscosity of 3.9 Pa.s is obtained.

EXAMPLE 9

33 g (0.15 mol) of 1-isocyanato-3,3,5-trimethyl5-(isocyanatomethyl) cyclohexane are added to 150 g (0.3 mol) of b1 at 100° C. and the mixture is stirred for 60 minutes. It is then cooled to 30° C. and 900 g of a1 are stirred in. A nonaqueous formulation having an NCO content of 17.8% and a viscosity of 3.4 Pa.s is obtained.

EXAMPLE 10

38 g (0.15 mol) of a mixture of 50 parts of 2,4'-diisocyanatodiphenylmethane and 50 parts of 4,4'-diisocyanatodiphenylmethane are added to 150 g (0.3 mol) of b1 at 40° C. and the mixture is stirred for 30 minutes. It is then cooled to 30° C. and 900 g of a1 are stirred in. A nonaqueous formulation having an NCO content of 17.9% and a viscosity of 3.7 Pa.s is obtained.

EXAMPLE 11

21 g (0.08 mol) of hexamethylene diisocyanate are added to 80 g (0.16 mol) of b1 at 60° C. and the mixture is stirred for 30 minutes. It is then cooled to 30° C. and 900 g of a1 are stirred in. A nonaqueous formulation having an NCO content of 19.7% and a viscosity of 3.0 Pa.s is obtained.

EXAMPLE 12

15 g (0.085 mol) of a mixture of 80 parts of toluylene 2,4-diisocyanate and 20 parts of toluylene 2,6-diisocyanate are added to 150 g (0.17 mol) of b2 at 40° C. and the mixture is stirred for 30 minutes. It is then cooled to 30° C. and 900 g of a1 are stirred in. A nonaqueous formulation having an NCO content of 18.2% and a viscosity of 3.9 Pa.s is obtained.

COMPARATIVE EXPERIMENT 1

58 g of a1 (equimolar amounts of OH groups and NCO groups) are added to 150 g of b 1 at 60° C. and the mixture is stirred as in Example 1. After 60 minutes, it is cooled to 30° C. and 900 g of a1 are stirred in as in Example 1.

COMPARATIVE EXPERIMENT 2

57 g of a2 (equimolar amounts of OH and NCO groups) are added to 150 g of b1 at 60° C. and the mixture is stirred. After 60 minutes, it is cooled to 30° C. and 900 g of a2 are stirred in as in Example 3. The formulation is inhomogeneous and contains slimy lumps.

COMPARATIVE EXPERIMENT 3

38 g of 4,4'-diisocyanatodiphenylmethane are added to 150 g of b1 at 40° C. and the mixture is stirred for 30 minutes. It is then cooled to 30° C. and 900 g of aV are stirred in. A nonaqueous formulation having an NCO content of 25% and a viscosity of 0.4 Pa.s is obtained.

COMPARATIVE EXPERIMENT 4

27 g of a mixture of 80 parts of toluylene 2,4-diisocyanate and 20 parts of toluylene 2,6-diisocyanate are added to 150 g of b1 at 40° C. and the mixture is stirred for 30 minutes. It is then cooled to 30° C. and 900 g of aV are stirred in. A nonaqueous formulation having an NCO content of 25% and a viscosity of 0.4 Pa.s is obtained.

Application test 6 g of the isocyanate formulation from Examples 1–5 and Comparative Experiments 1–4 are colored with 0.05% of Sudan Red. The formulations are dispersed in 200 ml of the aqueous polyurethane dispersion Luphen® D 200 A (BASF AG) using a propeller stirrer (diameter 4 cm) at a speed of 200 rpm in the course of 120 seconds. The resulting emulsions are shaken in a 1 l settling vessel and evaluated after 1 hour.

| Formulation | Evaluation |
| --- | --- |
| Example 1 | <0.1 ml settled out, dispersion homogeneous |

-continued

| Formulation | Evaluation |
|---|---|
| Example 2 | <0.1 ml settled out, dispersion homogeneous |
| Example 3 | <0.1 ml settled out, dispersion homogeneous |
| Example 4 | <0.1 ml settled out, dispersion homogeneous |
| Example 5 | <0.1 ml settled out, dispersion homogeneous |
| Comparative Experiment 1 | 8 ml settled out |
| Comparative Experiment 2 | not tested |
| Comparative Experiment 3 | 8 ml settled out |
| Comparative Experiment 4 | 8 ml settled out |

Mixtures with Adhesive Dispersions Dispersion 1

262 g of demineralized water, 35 g of feed 1 (see below) and 20 g of feed 2 are initially taken in a reaction vessel having a stirrer and two feed vessels (feed 1 and feed 2) and are heated to 85° C. After 15 minutes, feed 1 is uniformly added to the reaction vessel in the course of 2 hours and feed 2 in the course of 2.5 hours. After the final addition of initiator (feed 2), the dispersion is stirred for a further hour at 85° C. After the polymerization, 50 g of 20% strength by weight solution of the emulsifier p-isononylphenol polyoxyethylene(4) sodium sulfate are added to the dispersion and the mixture is stirred.

Feed 1: (this feed is stirred during polymerization)
82.5 g of demineralized water
400 g of ethyl acrylate
90 g of methyl methacrylate
10 g of 2-hydroxyethyl acrylate
50 g of a 20% strength by weight solution of the sodium salt of the emulsifier p-dodecyldiphenyl ether disulfonate in water
50 g of a 20% strength by weight solution of the reaction product of p-isononylphenol with 50 mol of ethylene oxide, as an emulsifier, in water
Feed 2:
100 g of demineralized water
5 g of sodium persulfate Dispersion 2

The procedure is similar to that for Dispersion 1, but without subsequent hydrolysis with p-isononylphenol polyoxyethylene(4) sodium sulfate and with the following change to the monomer combination for feed 1:
495 g of ethyl acrylate
5 g of 2-hydroxyethyl acrylate Dispersion 3

The procedure is similar to that for Dispersion 2 but with the following change in the monomer combination for feed 1:
480 g of ethyl acrylate
0 g of 3-hydroxypropyl acrylate Dispersion 4

The procedure is similar to that for Dispersion 2 but with the following change to feed 1 and feed 2:
Feed 1:
100 g of n-butyl acrylate
300 g of ethyl acrylate
90 g of methyl methacrylate
10 g of 4-hydroxybutyl acrylate
25 g of 20% strength by weight solution of the sodium salt of the emulsifier p-dodecyldiphenyl ether disulfate in water
20 g of a 20% strength by weight solution of the emulsifier polyoxyethylene(20) sorbitan monopalmitate
Feed 2:
100 g of demineralized water
2.5 g of sodium persulfate Adhesive Bonds in Laminated Films 3% (based on the solids content of Dispersions 1–4) of the polyisocyanate formulation from Example 1 was stirred into said dispersions and distributed homogeneously. These polyacrylate formulations were then applied by means of a knife coater to various films heated to 50° C. (with polyethylene terephthalate: PETP; polyamide: PA; polyvinyl chloride: PVC; polypropylene (corona-pretreated): PP) to give a layer having a thickness of 3 g/m when dry, and, after 20 seconds, said films were laminated with a polyethylene film (corona-pretreated). The films were then stored at room temperature and under standard humidity conditions for 3 and 7 days, and the films were cut into 2 cm wide strips. These strips were then pulled apart at 23° C. at an angle of 180° C. at a rate of 100 mm/min. The peeling force in N for the 2 cm wide strips was stated.

| | Peel strengths in N of laminated films | | | |
|---|---|---|---|---|
| | PETP/PE | PA/PE | PVC/PE | PP/PE |
| Dispersion 1 + 3% of polyisocyanate formulation | | | | |
| after 3 days | 3.5 | 2.5 | 4.0 | 1.4 |
| after 7 days | 4.4 | 4.0 | 4.2 | 2.5 |
| Dispersion 2 + 3% of polyisocyanate formulation | | | | |
| after 3 days | 2.5 | 2.0 | 2.2 | 2.1 |
| after 7 days | 2.5 | 2.5 | 3.3 | 2.1 |
| Dispersion 3 + 3% of polyisocyanate formulation | | | | |
| after 3 days | 2.1 | 1.9 | 2.2 | 1.4 |
| after 7 days | 2.0 | 2.5 | 2.4 | 1.5 |
| Dispersion 4 + 3% of polyisocyanate formulation | | | | |
| after 3 days | 4.5 | 2.7 | 3.3 | 2.5 |
| after 7 days | 4.5 | 3.0 | 3.3 | 2.5 |

We claim:
1. A nonaqueous polyisocyanate formulation having an improved shelf life containing:
a) one or more aliphatic polyisocyanates having a mean NCO functionality of from 2.5 to 3.5; and
b) an effective amount of a reaction product of i) with ii) which ensures that the polyisocyanate is dispersible in an aqueous medium, wherein
i) is a diisocyanate selected from the group consisting of tetramethylene diisocyanate, hexamethylene diisocyanate, dodecamethylene diisocyanate, 1,4-diisocyanatocyclohexane, 4,4'-di(isocyanatocyclohexyl)-methane, diisocyanatotrimethylhexane, diisocyanatotetramethylhexane, 1-isocyanato-3,3,5-trimethyl-5-(isocyanatomethyl)-cyclohexane, toluylene 2,4- and 2,6-diisocyanate, tetramethylxylylene diisocyanate, p-xylylene diisocyanate, 2,4'- and 4,4'-diisocyanatodiphenylmethane, and mixtures thereof, and ii) is a monohydroxy or dihydroxy polyalkylene ether alcohol containing at least one alkylene ether group with 2 to 4 carbon atoms and which contains a polyether chain having 8 or more ethylene ether units, with the proviso that the reaction product is obtained by reacting the diisocyanate with the polyalkylene ether alcohol using from 80 to 120 equivalent %, based on the NCO groups of the diisocyanate, of OH groups of the polyalkylene ether alcohol.

2. A polyisocyanate formulation as claimed in claim 1, containing from 1 to 25% ethylene ether units, by weight, based on the formulation.

3. A polyisocyanate formulation as claimed in claim 1 or 2, wherein the polyalkylene ether alcohol is a monohydroxy alcohol.

4. A polyisocyanate formulation as claimed in claim 1, containing from 5 to 20% ethylene ether units by weight, based on the formulation.

5. A polyisocyanate formulation as claimed in claim 1, containing from 10 to 15% ethylene ether units by weight, based on the formulation.

6. A polyisocyanate formulation as claimed in claim 1, wherein said at least one alkylene ether group contains a polyether chain having not less than 10 and not more than 70 ethylene ether units.

7. A polyisocyanate formulation as claimed in claim 6, wherein said at least one alkylene ether group contains a polyether chain having not more than 20 ethylene ether units.

* * * * *